Jan. 22, 1963   M. A. MOFFAT   3,074,614
CARTONS

Filed March 20, 1961   6 Sheets-Sheet 1

Inventor
Maurice A. Moffat
By Cushman, Darby Cushman
Attorneys

Jan. 22, 1963  M. A. MOFFAT  3,074,614
CARTONS
Filed March 20, 1961  6 Sheets-Sheet 2
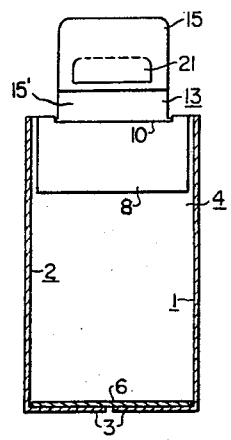
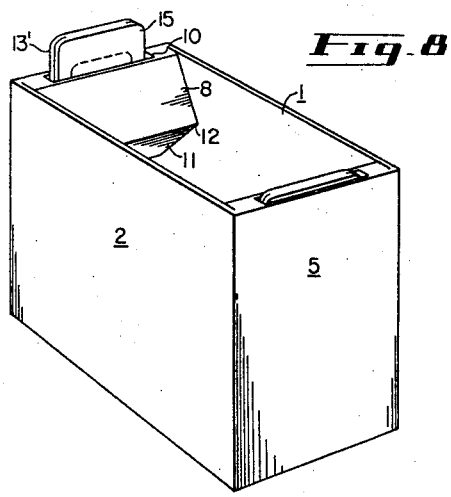
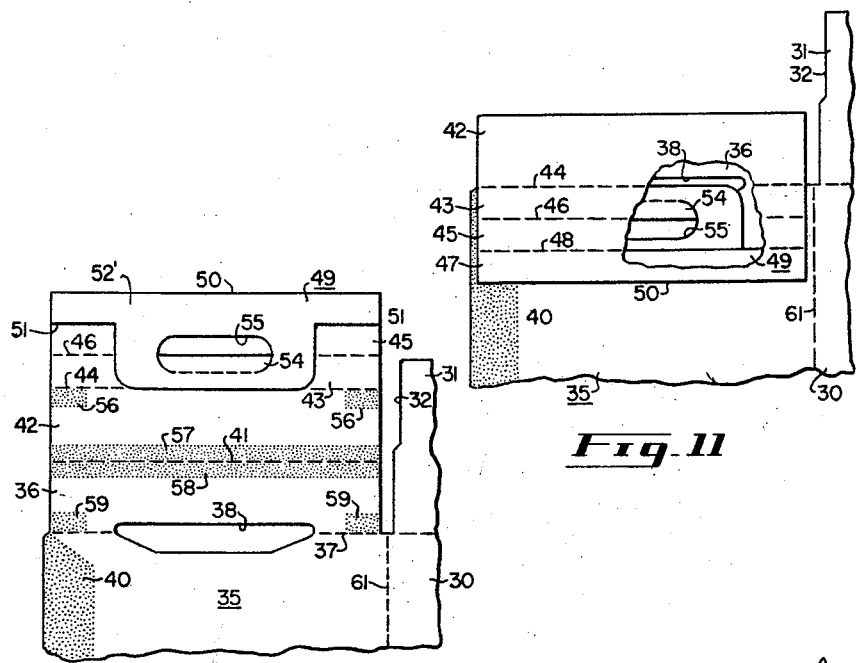

Jan. 22, 1963   M. A. MOFFAT   3,074,614
CARTONS
Filed March 20, 1961   6 Sheets-Sheet 3
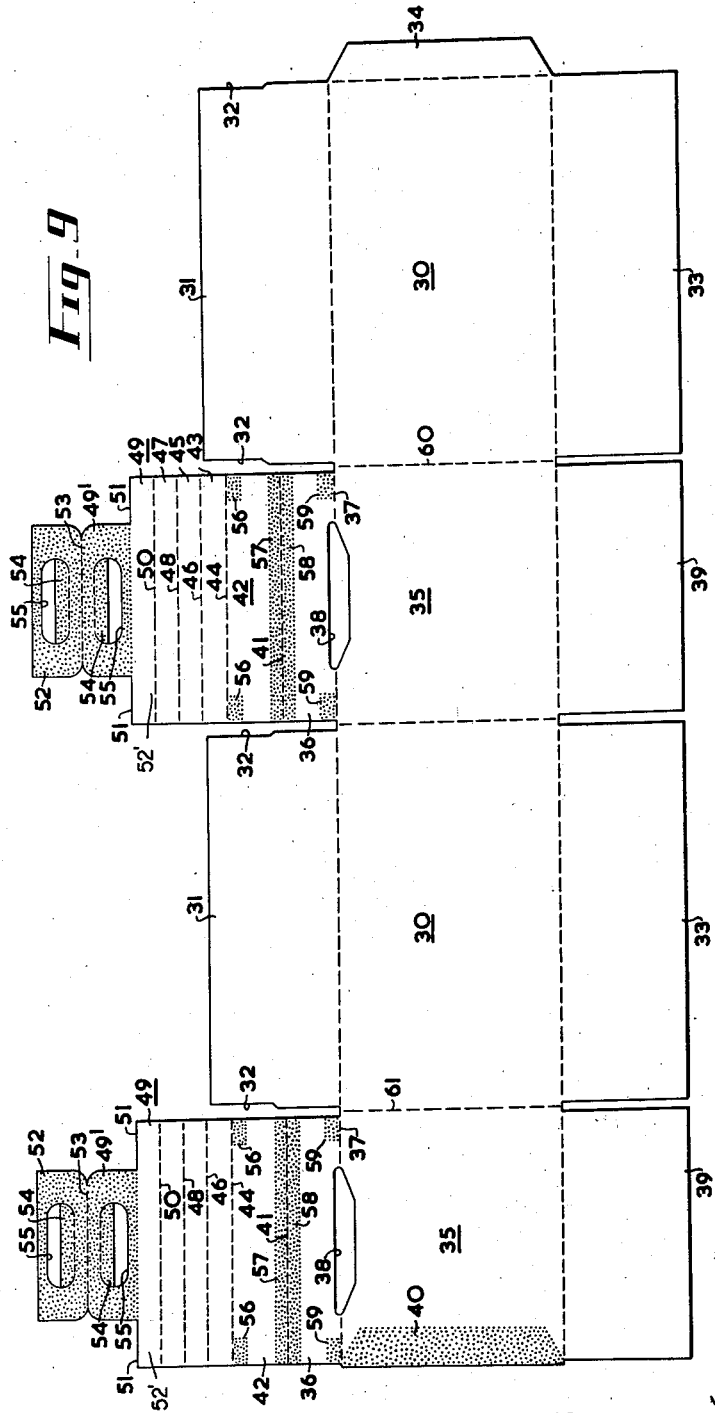

Jan. 22, 1963   M. A. MOFFAT   3,074,614
CARTONS

Filed March 20, 1961   6 Sheets-Sheet 4

Inventor
Maurice A. Moffat
By Cushman, Darby & Cushman
Attorneys

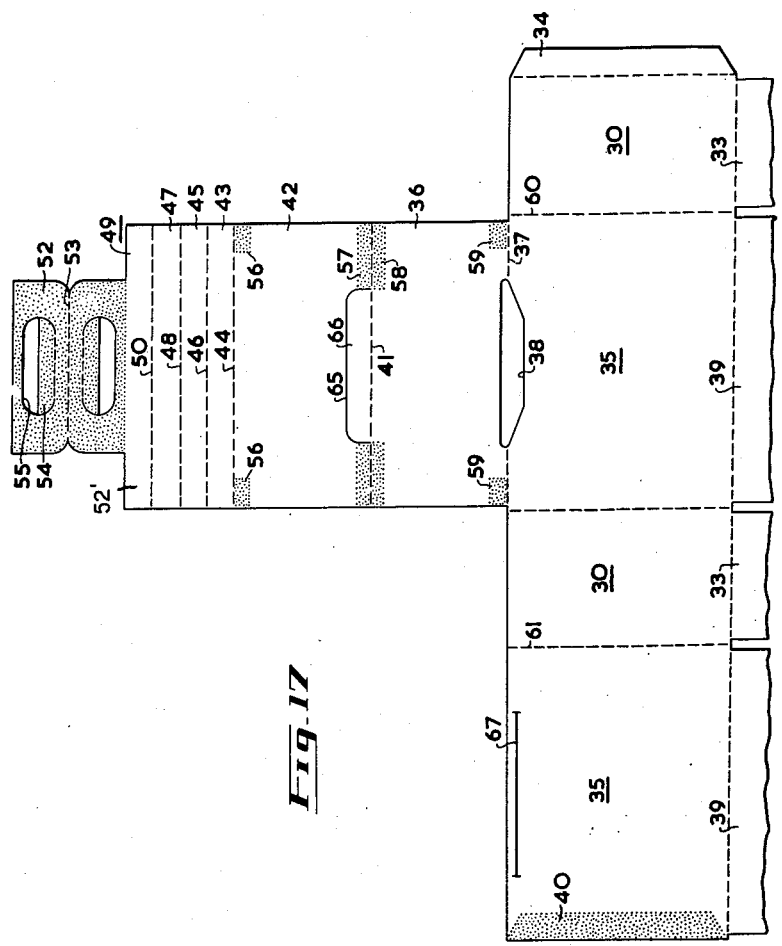

United States Patent Office 3,074,614
Patented Jan. 22, 1963

3,074,614
CARTONS
Maurice A. Moffat, Ottawa, Ontario, Canada, assignor to Unipak Cartons Ltd., Vancouver, British Columbia, Canada, a company of British Columbia
Filed Mar. 20, 1961, Ser. No. 96,845
Claims priority, application Canada Oct. 28, 1960
19 Claims. (Cl. 229—52)

This invention relates to cartons and more particularly to an improved carrying means therefor.

Cartons or carriers having carrying handles or hand-holes are well known but, for one reason or another, are disadvantageous.

The simplest form known is a carton with at least one hand-hole in a side or end wall whereby it can be grasped and carried, but this has had the disadvantage that the weight of a filled carton has caused the wall structure to tear adjacent to the hand-hole when the carton has been lifted. Another simple form, has been to provide a carton with an auxiliary handle permanently projected from the top closure forming part of the wall structure and has suffered from the dual disadvantage that such cartons could not be stacked upon one another due to said projecting handle and that it was necessary to remove the hand before the top closure could be opened.

In another form, the carton or carrier has been open-topped and provided with either a fixed or sliding handle forming part of a partition extending along the central longitudinal axis of the carrier. In the former case, the fixed handle has not been too successful due to hand-grasping and stacking difficulties. Moreover, both in the case of the fixed and sliding handles, the location of the latter has necessitated at least one internal partition being provided within the carrier, regardless of whether actually required or not, in order that some form of means for limting the amount of outward movement of said handles could be provided.

Furthermore, closed top cartons are well known which incorporate sliding handles but have suffered from the disadvantage that means have had to be provided within the carton to limit the amount of outward movement of the handle so that said carton could be carried with the top closure open or sealed. In one such case, these means have taken the form of the top end flaps being inturned to engage with the handle member and, in other cases, these means have taken the form of at least one internal partition within the carton. However, in the case of closed top cartons, the sliding handles have always been arranged along the central longitudinal axis of the carton and in consequence of this, have also formed at least part of an internal partition.

To sum up, extensible or slidable handles are obviously more effective than hand-holes, but it is not always desirable that the former should be capable of projection through the actual top closure flaps nor is it desirable that such handles should form part of an internal assembly of partitions within the carton.

Thus, it is one object of the present invention to overcome the above disadvantages by providing a one-piece blank adapted to form a carton with at least one extensible handle integral therewith. Another object of the invention is to provide a carton with at least one extensible handle located adjacent an edge of said carton. A further object of the invention is to provide improved load bearing and distributing means.

According to one broad aspect, the present invention relates to a carton including a bottom, side walls and end walls; at least one flap, said flap being integral with and hingedly connected to a selected wall along a common edge; a slot in said common edge; an extensible handle member normally located in a first retracted position within the carton, said handle being capable of movement in said slot between said retracted position and a second operative position in which a reduced portion thereof projects beyond said common edge for carrying purposes; at least one panel member, intermediate said flap and said handle member and integrally and hingedly secured thereto for limiting movement of said handle member in the retracted position; and means on said handle member cooperating with said common edge to limit the amount of movement of said reduced portion beyond said common edge.

According to another broad aspect, the present invention relates to a one-piece blank for forming a carton; said blank being cut and scored to provide a plurality of main panels integrally joined together along a plurality of score lines and adapted, on folding of the blank, to form side walls and end walls; a plurality of secondary panels each integrally joined to an associated main panel along a score line and adapted, on folding of the blank, to form a bottom; a flap integrally and hingedly joined to a selected main panel along a first common score line which, on folding of the blank, is adapted to form a common edge between said flap and said selected main panel; a slot in said first common score line; at least one intermediate panel one side of which is integrally and hingedly joined to said flap along a second common score line; an ancillary panel integrally and hingedly joined to the other side of said intermediate panel along a third common score line whereby said latter panel is intermediate said flap and said ancillary panel; said ancillary panel, on folding of said blank, serving as an extensible handle member normally located in a first retracted position within the carton, said handle being capable of movement in said slot betweenn said retracted position and a second operative position in which a reduced portion thereof projects beyond said common edge for carrying purposes; said intermediate panel, on folding of the blank and erection of the carton, being adapted to be instrumental in limiting movement of said handle member in the retracted position; said blank being further cut and scored to provide means on said handle member adapted, on folding of the blank and erection of the carton, to cooperate with said common edge and to limit the amount of movement of said reduced portion beyond said common edge.

The invention is illustrated by way of example, in the accompanying drawings in which:

FIGURE 7 is a sectional end elevation of the open-topped carton showing the handle in its fully extended position;

FIGURE 8 is a perspective view of an open-topped carton provided with an extensible handle in each end wall;

FIGURE 9 is a plan view of an alternative form of one-piece blank capable of adaption to a carton having an integral top closure formed of mutually cooperating top flaps;

FIGURES 10 and 11 are detail views of a portion of the blank shown in FIGURE 9 illustrating different stages in the assembly of the carton having an integral top closure of mutually cooperating flaps;

FIGURE 17 is a plan view of an alternative form of one-piece blank capable of adaption to a carton having an integral top closure formed by a single top closure flap.

Figure 1:
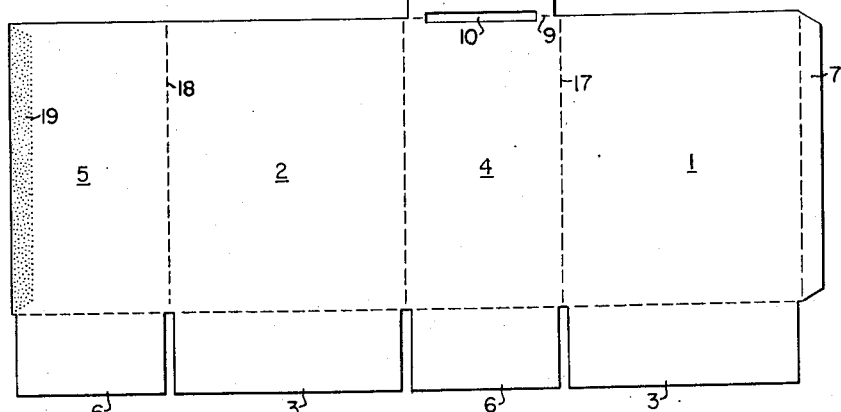
FIGURE 1 is a plan view of one form of a one-piece blank capable of adaption to an open-topped carton.

Referring to the drawings and in particular to FIGURE 1, the one-piece blank shown therein is cut and scored to provide a plurality of main panels, joined together along a plurality of score lines, said main panels being formed by a pair of side wall panels 1, 2 each having an integral secondary panel adapted to form a bottom side flap 3 and a pair of end wall panels 4, 5 each having an integral secondary panel adapted to form a bottom end flap 16. The outermost side wall panel 1 is also provided with a foldable tab 7.

At least one selected wall panel, for example end wall panel 4, is provided with at least one flap 8 integrally and hingedly connected thereto along a first common score line 9. A slot 10 is provided in said first common score line 9 intermediate the ends thereof.

An intermediate panel member 11, of less depth than the depth of said flap 8, is integrally and hingedly connected at one side thereof to the flap 8 along a second common score line 12 and an ancillary panel, forming an extensible handle member indicated generally at 13, is integrally connected to the other side of the intermediate panel member 11 along a third common score line 14, said handle member 13 having a main body portion 15′ and a reduced carrying portion 13′ and being provided with a strengthening carrying portion 15 connected by means of a further common score line 16.

It will also be seen from FIGURE 1 that one face of the strengthening carrying portion 15, as well as the reduced carrying portion 13′ of the handle member 13, is coated with any suitable pressure sensitive adhesive, as is a marginal edge 19 of the end wall panel 4 and the obverse face of the tab 7 on the side wall panel 1.

In forming the open-topped carton to its knock-down condition, the strengthening carrying portion 15 is folded along the score line 16 and pressure applied so that it adheres to the coated face of the reduced carrying portion 13′ of the handle member 13.

Figure 2:
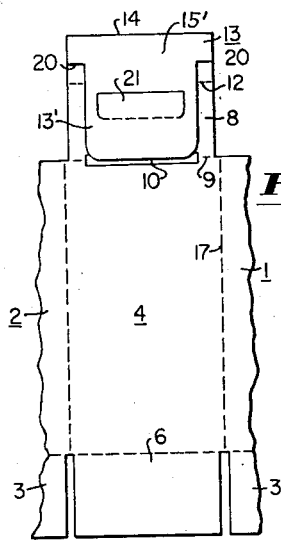
FIGURES 2 and 3 are detail views of a portion of the blank shown in FIGURE 1 illustrating different stages in the assembly of the carton.
Figure 3:
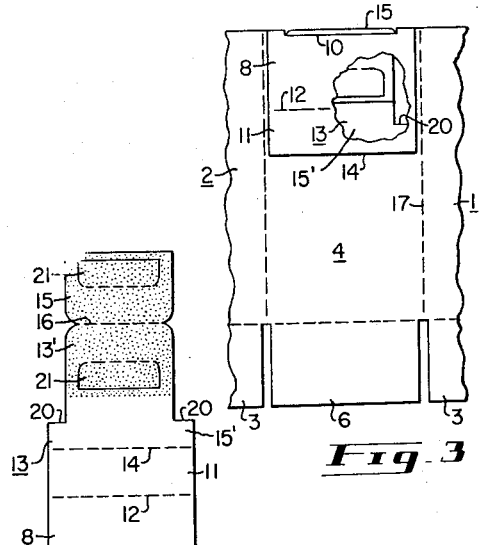

The handle member 13 is then folded along the third common score line 14 as is shown in FIGURE 2. Thereafter, the flap 8 is folded along the first common score line 9 as shown in FIGURE 3 whereby the handle member 13 will lie between the end wall panel 4 and the flap 8 so that the common upper edge of said carrying portion 13′ and the strengthening carrying portion 15 is coincident with the slot 10 and in alignment with the first common score line 9.

The side wall panel 1 and bottom side flap 3 are then folded over along score line 17 so that the former overlies the end wall panel 4 and partially overlies the side wall panel 2, and so that the coated side of the hingeable tab 7 is uppermost. Thereafter, the end wall panel 5 is folded along score line 18 so that its coated marginal edge 19 overlies the coated side of tab 7. Pressure is then applied to form a knock-down carton.

It will be observed from FIGURE 1 that the main body portion 15′ of the handle member 13 is provided with a pair of shoulders 20. Moreover, both the reduced carrying portion 13′ and the strengthening carrying portion 15 are each provided with a foldable flap 21 adapted, when hinged, to form a hand-hole whereby said handle can be utilized for carrying purposes.

When it is desired to fill the carton, the latter is erected in known manner, and the bottom flaps 3 and 6 folded over and sealed by any conventional means such as by stapling, tape, or pressure sensitive adhesive. The open-topped carton is then filled with the desired contents. In this position, the extensible handle member 13 in vertical alignment with the slot 10 and is located in a first retracted position within the carton, wherein said handle member is parallel with and located between the end wall 4 on one side and the intermediate panel member 11 on the other side, and in this position the intermediate panel member 11 is instrumental in limiting movement of said handle member in the retracted position as is shown in FIGURE 4.

When it is desired to carry the carton by hand, the user merely grasps the upper edge of the handle which, due to the shape of the slot 10, is readily accessible, and pulls upwardly.

As the handle member 13 is pulled upwardly through the slot 10, the intermediate panel member 11 commences to hinge about common score lines 14 and 12. Concurrently, flap 8 commences to hinge about common score lines 9 and 12. Thus, as viewed in FIGURE 5, the extreme left-hand end of the intermediate panel 11 follows the upward movement of the handle member 13 whilst its extreme right-hand end forces the lower end of flap 8 outwardly and away from the end wall 4. FIGURE 5 illustrates the position of the handle components when the handle member 13 has reached the approximate midway point of its upward travel.

Figures 4, 5, 6:
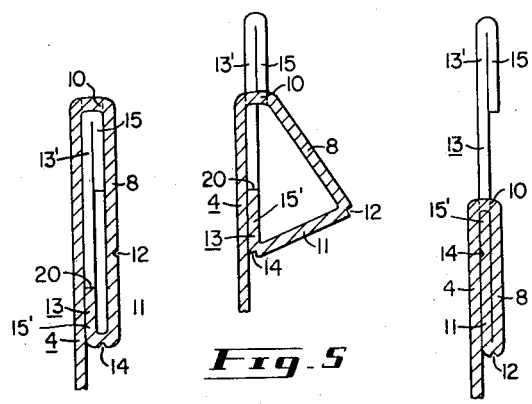
FIGURES 4 to 6 are sectional elevations of one end of the carton showing the handle member in various positions.

If the upward movement of the handle member is then continued, the intermediate panel member 11 will continue to hinge about common score lines 14 and 12, as will the flap 8 about common score lines 12 and 9, and as the intermediate panel member 11 passes over dead centre, the lowermost end (as viewed in FIGURE 5) of the flap 8 will commence to return to its original position so that, when the handle member 13 is in its fully extended position as shown in FIGURES 6 and 7, said flap 8 will again be parallel with the end wall 4.

As will be seen more easily from FIGURE 6, when the handle member 13 is in its fully extended or second operative position, the main body portion 15′ of the latter as well as the intermediate panel member 11 are both located between the end wall 4 and the flap 8 and parallel therewith. Thus, both the first retracted position and the second operative position of the handle member 13 is in the same vertical plane as the slot 10 and the main body portion 15′ of said handle member is always parallel to, and in sliding face-to-face contact with, said selected wall 4 throughout movement of the handle and in each of said positions.

The shoulders 20 on the handle member 13 constitute means for limiting the amount of upward movement of the latter beyond the common edge, formed by the junction of the end wall 4 with the flap 8 and in which the slot 10 is located, when said shoulders 20 engage with the underside of said common edge.

Once the handle member 13 is in its fully extended upward or second operative position, the user merely pushes the flaps 21 outwardly and inserts a hand in the hand-hole for carrying purposes.

When it is desired to stack a number of erected cartons upon one another, the handle member of each carton, if extended, is merely pushed downwardly in its respective slot 10 until the position shown in FIGURE 4 is reached whereupon each handle will be concealed and the upper edge thereof will be in alignment with the upper edge of the carton thereby presenting the carton with a flush upper edge.

It will be appreciated that although only one end of the carton shown in connection with FIGURES 1 to 7 of the drawings is provided with an extensible carrying handle, it is within the scope of the invention to provide a pair of mutually opposed walls each with such a handle, such as is shown in FIGURE 8. Moreover, the pair of mutually opposed walls may either be the end walls or the side walls of the carton.

Although the invention has only been described and illustrated thus far as applied to an open-topped carton, it is equally suitable for a carton provided with an integral top closure formed by mutually cooperating top flaps as will now be described.

Referring now to FIGURE 9, it will be seen that a one-piece blank is scored and incised to provide a plurality of main panels joined together along a plurality of score lines, said main panels being formed by a pair of side wall panels 30 each provided with an integral top side closure flap 31 slightly recessed at 32, and an integral secondary panel adapted to form a bottom side closure flap 33, the extreme right-hand (as viewed in FIGURE 9) side wall panel 30 being provided with a foldable tab 34 the obverse face of which is coated with any suitable pressure sensitive adhesive.

The one-piece blank is also cut and scored to provide a pair of end wall panels 35 each having an integral top end closure flap 36 joined thereto along a first common score line 37. A slot 38 is also provided between each end wall panel 35 and the top end closure flap 36 and extends a predetermined distance along the first common score line 37. Each end wall panel 35 is also provided with an integral secondary panel adapted to form a bottom end closure flap 39, whilst the extreme left-hand (as viewed in FIGURE 9) end wall panel 35 is provided with a marginal strip 40 of pressure sensitive adhesive.

Each top end closure flap 36 is integrally joined, along a second common score line 41, to a plurality of articulated intermediate panel members, the first intermediate panel member 42 being of slightly less depth than said top end closure flap 36. A second intermediate panel member 43 of said plurality thereof has a depth substantially less than that of the first intermediate panel membeo 42, and is integrally joined to the latter along a score line 44. A third intermediate panel member 45, of said plurality thereof, is integrally joined to the second intermediate panel member 43 along a further score line 46; and a fourth intermediate panel member 47, of said plurality thereof, is integrally joined to the third intermediate panel member 45 along score line 48. As will be seen from FIGURE 9, the second, third and fourth intermediate panel members 43, 45 and 47 are each of the same depth.

An extensible handle member, indicated generally at 49, is integrally joined to the fourth intermediate panel member 47 along a third common score line 50, and has a main body portion 52' provided with a pair of shoulders 51. The depth of the main body portion 52' of each extensible handle member 49 located between the shoulders 51 and the third common score line 50 is the same as the depth of each of the second, third and fourth intermediate panel members 43, 45 and 47.

The handle member 49 has a reduced carrying portion 49' and a handle strengthening panel 52 integrally joined together along a score line 53, and both the reduced carrying portion 49' and the strengthening panel 52 are each provided with a foldable flap 54 defining a hand-hole 55. As will be seen from FIGURE 9, one face of each reduced carrying portion 49' of handle member 49 and its handle strengthening panel 52 is coated with any suitable pressure sensitive adhesive.

Each of the first intermediate panel members 42 is provided with two areas 56 of pressure sensitive adhesive, located adjacent each end of the score line 44. A strip 57 of similar pressure sensitive adhesive also extends across the width of said first intermediate panel member 42 adjacent to the second common score line 41.

Each of the top end closure flaps 36 is provided with a strip 58 of pressure sensitive adhesive extending across its width adjacent to the second common score line 41 and corresponding in area to the coated strip 57 of the adjacent first intermediate panel member 42. Moreover, each of the top end closure flaps 36 is provided with two areas 59, corresponding to the areas 56, also coated with pressure sensitive adhesive and located adjacent to the first common score line 37.

In forming a knock-down carton from the one-piece blank just described, each handle strengthening panel 52 is folded about the score line 53 so that it overlies the reduced carrying portion 49' of its adjacent handle member 49. Each handle member 49 is then folded along the adjacent third common score line 50 so that portions of said member partially overlie the second, third and fourth intermediate panel members 43, 45 and 47 as is shown in FIGURE 10.

Each of the first intermediate panel members 42, together with the associated intermediate panel members 43, 45 and 47 as well as the respective handle member 49, is then folded over along the second common score line 41 so that the said components assume the position shown in FIGURE 11. In this position, each handle member 49 is located between the adjacent end wall panel 35 and its associated second, third and fourth intermediate panel members 43, 45 and 47, with the upper edge of said handle members 49 in alignment with the top of the associated slot 38. Each handle member 49, and its associated intermediate panel members and top end closure flap 36, lie parallel with the respective end wall panel 35 in this position.

The extreme right-hand (as viewed in FIGURE 9) side wall panel 30 and its top and bottom side flaps 31 and 33 is then folded over, along score line 60, so that it overlies the entire adjacent end wall panel 35 and its neighbouring handle components as well as a portion of the remaining side wall panel 30. In this position, the coated face of the tab 34 will be uppermost.

The extreme left-hand wall panel 35 and its top and bottom end flaps is then folded over, along the score line 61 (see FIGURE 9) so that said end wall panel overlies the remainder of the adjacent side wall panel 30 and so that the coated marginal strip 40 is brought into alignment with the coated face of the tab 34.

Pressure is then applied to the entire assembly and this causes the coated face of each handle strengthening panel 52 to adhere to the coated portion of its associated reduced carrying portion 49'. This pressure also causes each pair of coated areas 56 on each of the first intermediate panel members 42 to adhere to the similar coated areas 59 on the associated top end flap 36, as well as the coated strip 57 with the corresponding area 58 on said top end flap 36. The pressure also causes the tab 34 to adhere with the coated marginal strip 40. Complete adhesion then exists between the components and a knock-down carton is formed.

When it is desired to utilize the carton, it is erected in known manner, the bottom side 33 and end 39 closure flaps sealed by means of stapling, tape or pressure sensitive adhesive, and the carton filled with the desired contents.

It will be appreciated that, when the carton is erected for filling purposes, each handle member 49 and its associated intermediate panel members and top end closure flaps will lie parallel to the respective end wall 35 with each handle member 49 in vertical alignment with an associated slot 38. However, once the carton has been filled, each top end closure flap 36 is folded along the first score line 37, and, due to the adjacent first intermediate panel member 42 being secured in face-to-face contact with said top end closure flap 36, said first intermediate panel member 42 will fold about score line 44, so that each combined pair of top end closure flaps 36 and first intermediate panel members 42 will thereupon extend at right angles to the associated end wall 35 as well as at right angles to the adjacent handle member 49 and second, third and fourth intermediate panel members 43, 45 and 47. This position is shown more clearly in FIGURE 12.

Figure 12:
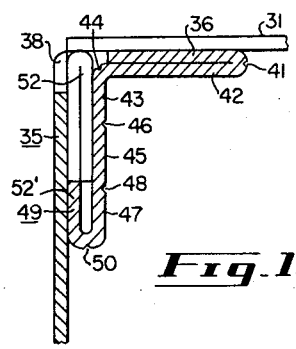
FIGURES 12 to 14 are sectional elevations of one end of the carton having an integral top closure of mutually cooperating flaps showing the handle member in various positions.

Thereafter, the top side closure flaps 31 are folded over and secured in any convenient manner, such, for example, as stapling, tape or pressure sensitive adhesive, to the top end closure flaps 36. This position is also shown in FIGURE 12, where, as will be seen, each handle member 49 is in its first retracted position whereby it is located between, parallel with, and in substantially face-to-face contact with the adjacent end wall 35 on one side and the associated second, third and fourth intermediate panel members 43, 45 and 47 on the other side.

When it is desired to carry the carton by hand, the user merely grasps the upper edge of each of the two mutually opposed handle members 49 which, due to the shape of the slots 38, are quite easily accessible, and pulls upwardly. For the sake of simplicity, the action of only one handle member will be described henceforward, however, such description is equally applicable to the remaining handle member.

Accordingly, as a handle member 49 is pulled upwardly through the associated slot 38, the fourth intermediate panel member 47 commences to hinge about the third common score line 50 and score line 48. The lower edge of said fourth intermediate panel member 47 follows the upward movement of the handle member thus moving its upper edge outwardly away from the adjacent end wall 35 and, in so doing, the third intermediate panel member 45 will move away from said end wall but parallel thereto. Simultaneously, the second intermediate panel member 43 will hinge about score lines 44 and 46 so that its lower end moves outwardly away from the adjacent end wall 35.

Figure 13:
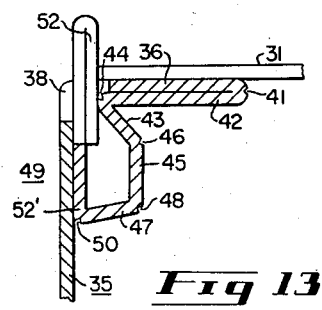

Accordingly, when the handle member 49 has reached the approximate midway point of its amount of upward movement, its component parts will have assumed the position shown in FIG. 13 where, as will be seen the second and fourth intermediate panel members 43 and 47 are at an angle to the handle member 49 and the third intermediate panel member 45.

Continued upward movement of the handle member 49 causes the second and fourth intermediate panel members 43 and 47 to take up a parallel relationship with the first intermediate panel member 42 whilst the handle member 49 and the third intermediate panel member 45 will be at right angles thereto. Thus, when the shoulders 51 of handle member 49 abut the underside of the common edge, said handle member will have reached its second operative position where its reduced carrying portion projects beyond said common edge for carrying purposes. This position is shown in FIGURE 14 where, as will be seen, the handle member 49 is in face-to-face contact with the adjacent end wall 35 on one side and parallel therewith, and parallel with and spaced from the third intermediate panel member 45.

Thus, both the first and second positions of the handle member 49 are in the same vertical plane as the slot 38 and the main body portion 52' of the handle member is always parallel to, and in sliding face-to-face contact with, said selected wall 35 throughout movement of the handle and in each of said positions.

When the handle member 49 is in its second operative position, the top end flap 36 and the first, second and fourth intermediate panel members 42, 43 and 47 are substantially at right angles to the end wall 35, the handle member 49, and the third intermediate panel member 45, said first intermediate panel member 42 being located between the top end flap 36 and the second intermediate panel member 43 and in face-to-face contact therewith, whilst the second and fourth intermediate panel members are in spaced parallel relationship with one another.

Figure 14:
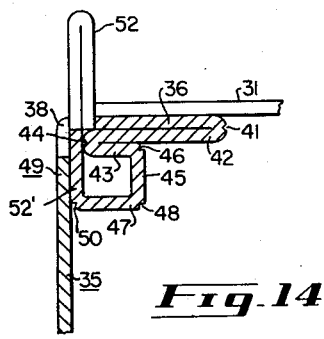

Thus, as will be seen from reference to FIGURE 14, the second, third and fourth intermediate panel members 43, 45 and 47, as well as the handle member 49, in effect and when the latter is in its fully extended second operative position, form a box-girder or a combined carton load-bearing and strengthening means which extends from one side of the carton to the other and which materially assists in strengthening the carton as well as to distribute the weight thereof, two such box-girders being provided, one at each end of the carton, due to the provision of the pair of handle members.

Once the handle members 49 are in their fully extended upward or second operative position, the user merely pushes the flaps 54 outwardly and inserts his hands in the hand holes 55 for carrying purposes. It will be appreciated that the recessed portions 32 of the top side flaps 31 permit the handle members to pass therethrough when the top closure flaps are in closed position.

When it is desired to stack a number of erected cartons upon one another, the handle members 49, if extended, are merely pushed downwardly into their respective slots 38 until the position shown in FIGURE 12 is reached, whereupon each handle member will be concealed and the upper edge thereof will be in alignment with the common upper edge formed by the junction of the top end flaps 36 and the end walls 35, thereby presenting a carton with a flush upper surface.

Once the top closure flaps, and in particular the top end closure flaps 36, are replaced, the second, third and fourth intermediate panel members 43, 45 and 47 will again resume their position to form a pair of box-girders for carrying and carton-strengthening purposes.

Figure 15:
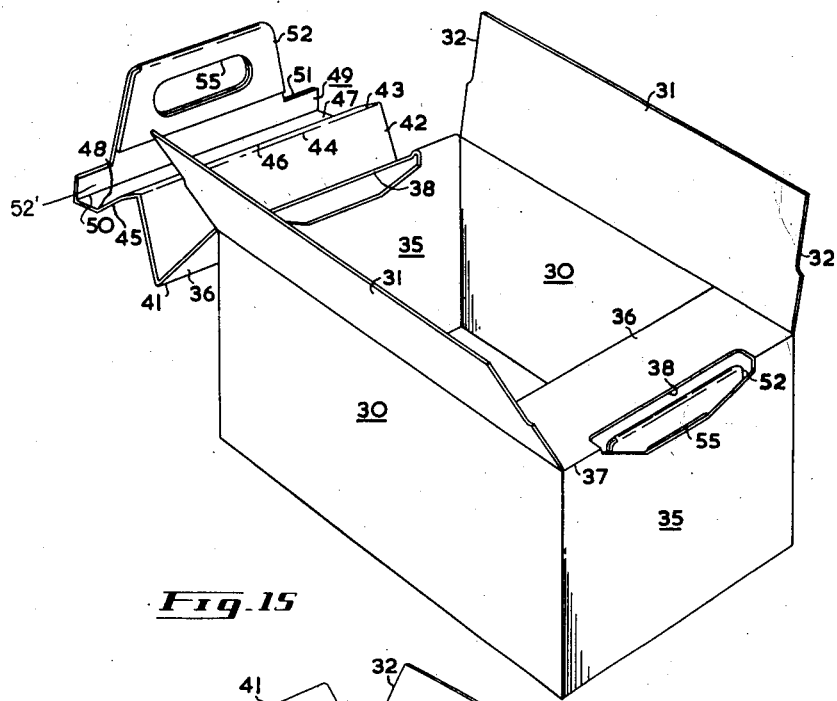
FIGURES 15 and 16 are perspective views of the carton having an integral top closure of mutually cooperating flaps formed by the one-piece blank shown in FIGURE 9.
Figure 16:
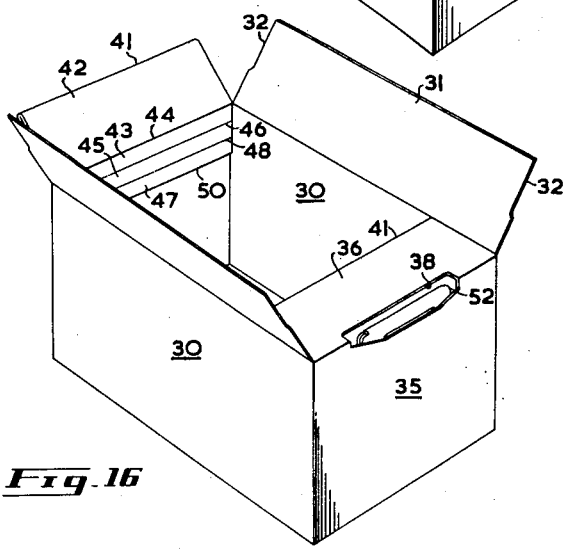

FIG. 15 of the drawings shows the carton formed from the one-piece blank of FIG. 9 with one top end closure flap in closed position and the associated handle in its lowermost position, whilst the opposed top end flap and associated handle are in an open and unfolded condition. FIGURE 16 shows the same carton with one top closure end flap in closed position and the associated handle member in its lowermost position, whilst the opposed top end flap is in its open position with the associated handle member (not shown) in its fully extended downward position.

Although the second embodiment of the invention described above is applied to a carton having a top closure formed of mutually cooperating top flaps and a pair of mutually opposed extensible handles, said second form of the invention is equally applicable to the type of carton having a top closure formed of mutually cooperating top flaps but only having one such extensible handle. The second form of the invention described above is also applicable to a carton having a single top closure flap as will now be described.

In the form of one-piece blank shown in FIGURE 17, only one wall panel is provided with an integral top closure flap 36 whereas each wall panel is integrally provided with a bottom closure flap. The dimensions of the top closure flap 36 are such that its area is substantially equal to the horizontal cross-sectional area of the erected carton. The only other differences between this form of the invention and the second embodiment is that an incision 65 is provided in the first intermediate panel member 42 spaced a predetermined distance from the score line 41, the portion of said panel 42 enclosed by said incision 65 and the score line 41 subsequently forming a locking tab 66. It will also be observed from FIGURE 17 that the coated strip 57 on the first intermediate panel member 42 and the coated strip 58 on the top closure flap 36 is interrupted and that the depth of each of the intermediate panels 42, 43, 45, 47 is less than the depth of the flap 36.

Figure 18:
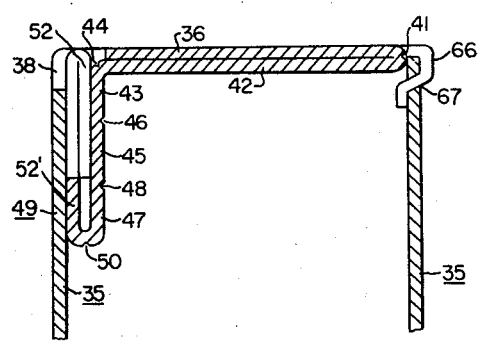
FIGURE 18 is a sectional elevation of an erected carton formed by the blank shown in FIGURE 17.

The blank is folded in a similar manner to that described above in connection with the second embodiment. However, when an erected carton is filled with the desired contents and the combined top closure flap 36 and first intermediate panel member 42 folded over to close the carton, the locking tab 66 is inserted into a cooperating slit 67 formed in an adjacent wall near the upper edge thereof. FIGURE 18 shows the disposition of the components of the third embodiment of the invention when the carton is erected and with the top closure flap 36 in its closed and operative position and with the handle member 49 in a first retracted position. The handle member 49, and its component parts, operates in exactly the same manner as the pair of extensible handle members described above in connection with the second embodiment of the invention. In other words, when the said handle member is pulled upwardly, the box-girder will be formed so as to serve as a combined carton-strengthening and load-bearing member extending throughout the length of said carton.

I claim:

1. A carton including a bottom, side walls and end walls; at least one flap, said flap being integral with and hingedly connected to a selected wall along a common edge; a slot in said common edge; an extensible handle member, having a main body portion and a reduced carrying portion, in vertical alignment with said slot and normally located in a first retracted position within the carton, said handle being capable of movement in said slot between said retracted position and a second operative position in which said reduced carrying portion projects beyond said common edge for carrying purposes, both of said positions being in the same vertical plane as said slot; said reduced carrying portion and said main body portion, throughout said movement and in each of said positions, always being parallel to said selected wall, and said main body portion, throughout said movement and in each of said positions, always being in sliding face-to-face contact with said selected wall; at least one panel member, intermediate said flap and said handle member and integrally and hingedly secured thereto, said intermediate panel being of less depth than the depth of said flap and being instrumental in limiting movement of said handle member in the retracted position; and means on said handle member cooperating with said common edge to limit the amount of movement of said reduced portion beyond said common edge.

2. A carton according to claim 1 wherein, when said handle member is in the said retracted position, both said portions of said handle member are parallel with and located between said selected wall on one side and said flap and intermediate panel member on the other side.

3. A carton according to claim 1 wherein, when said handle member is in its second operative position, said main body portion of said handle member and said intermediate panel member are parallel with and located between said selected wall on one side and said flap on the other side.

4. A carton according to claim 1 wherein said means on the handle member comprise at least one shoulder on said main body portion adapted to engage the underside of said common edge when said handle member is in its second operative position.

5. A carton including a bottom, side walls and end walls; at least one flap, said flap being integral with and hingedly connected to a selected wall along a common edge; a slot in said common edge; an extensible handle member having a main body portion and a reduced carrying portion, in vertical alignment with said slot and normally located in a first retracted position within the carton, said handle being capable of movement in said slot between said retracted position and a second operative position in which said reduced carrying portion projects beyond said common edge for carrying purposes both of said positions being in the same vertical plane as said slot; said reduced carrying portion and said main body portion, throughout said movement and in each of said positions, always being parallel to said selected wall, and said main body portion, throughout said movement in each of said positions, always being in sliding face-to-face contact with said selected wall; a plurality of panel members each of less depth than the depth of said flap, intermediate said flap and said handle member, and being instrumental in limiting movement of said handle member in the retracted position, said flap, handle member and intermediate panels, when said carton is in an erected condition, being articulated with respect to one another and to said selected wall; and means on said handle member cooperating with said common edge to limit the amount of movement of said reduced portion beyond said common edge.

6. A carton according to claim 5 wherein said plurality is constituted by a first intermediate panel member, a second intermediate panel member, a third intermediate panel member, and a fourth intermediate panel member.

7. A carton according to claim 6 wherein said flap and said first intermediate panel member are secured together in face-to-face contact.

8. A carton according to claim 7 wherein said handle member is connected to said fourth intermediate panel member and both of said portions of said handle are adapted, when said handle is in said retracted position, to be located between, parallel with, and in substantially face-to-face contact with said selected wall on one side, and said second, third, and fourth intermediate panel members on the other side.

9. A carton according to claim 8 wherein said handle member is connected to said fourth intermediate panel member; said main body portion of said handle member being adapted, when said handle is in said second operative position, to be partially in face-to-face contact with said selected wall on one side and parallel therewith, and to be parallel with and spaced from said third intermediate panel member on the other side.

10. A carton according to claim 9 wherein, when said handle member is in said second operative position, said flap and said first, second, and fourth intermediate panel members are substantially at right angles to said selected wall, said handle member and said third intermediate panel member.

11. A carton according to claim 10 wherein, when said handle member is in its said second operative position, said first intermediate panel member is located between said flap and said second intermediate panel member and in face-to-face contact therewith, said second and fourth intermediate panel members being in spaced parallel relationship.

12. A carton according to claim 11 wherein said means on the handle member comprise at least one shoulder on said main body portion adapted to engage the underside of said common edge when said handle member is in its second operative position.

13. A carton according to claim 12 wherein the said handle member and certain of said plurality of intermediate panel members form a combined carton load-bearing and strengthening means extending between mutually opposed walls of said carton and adjacent to said top closure.

14. A carton according to claim 13 wherein said flap constitutes a top closure flap and is adapted to cooperate with at least one other flap integral with a further wall to form a top closure for said carton.

15. A carton according to claim 13 wherein said flap is adapted to cooperate with a further wall of said carton to form a top closure therefor.

16. A one-piece blank for forming a carton; said blank being cut and scored to provide a plurality of main panels integrally joined together along a plurality of score lines and adapted, on folding of the blank, to form side walls and end walls; a plurality of secondary panels each integrally joined to an associated main panel along a score line and adapted, on folding of the blank, to form a bottom; a flap integrally and hingedly joined to a selected main panel along a first common score line which, on folding of the blank, is adapted to form a common edge between said flap and said selected main panel; a slot in said first common score line; at least one intermediate panel of less depth than the depth of said flap, one side of said intermediate panel being integrally and hingedly joined to said flap along a second common score line; an ancillary panel integrally and hingedly joined to the other side of said intermediate panel, along a third common score line whereby said latter panel is intermediate said flap and said ancillary panel; said ancillary panel, on folding of said blank, serving as an extensible handle member, having a main body portion and a reduced carrying portion, in vertical alignment with said slot and normally located in a first retracted position within the carton, said handle being capable of movement in said slot between said retracted position and a second operative position in which said reduced carrying portion projects beyond said common edge for carrying purposes, both of said positions being in the same vertical plane as said slot; said reduced carrying portion and said main body portion, throughout said movement and in each of said positions, always being parallel to said selected wall, and said main body portion, throughout said movement in each of said positions, always being in sliding face-to-face contact with said selected wall; said intermediate panel, on folding of the blank and erection of the carton, being adapted to be instrumental in limiting movement of said handle member in the retracted position; said blank being further cut and scored to provide means on said handle member adapted, on folding of the blank and erection of the carton, to cooperate with said common edge and to limit the amount of movement of said reduced portion beyond said common edge.

17. A one-piece blank according to claim 16 including a plurality of flaps each integrally and hingeably joined to an associated main panel and wherein said first common score line, on folding on the blank, is adapted to form a common edge between said flaps and said main panels, whilst said flaps mutually cooperate with one another to form a top closure; and a plurality of articulated intermediate panels integrally and hingeably joined to a said flap of a selected main panel along said second common score line, each of said intermediate panels being of less depth than the depth of each of said flaps; said ancillary panel being integrally and hingedly joined to said plurality of intermediate panels along said third common score line whereby said latter panels are located intermediate the said flap of said selected main panel and said ancillary panel; said intermediate panels, on folding of the blank and erection of the carton, being adapted to be instrumental in limiting movement of said handle member in said retracted position.

18. A one-piece blank according to claim 16 wherein said flap cooperates with a main panel mutually opposed to said selected main panel to form a top closure; and a plurality of articulated intermediate panels integrally and hingedly joined to said flap along said second common score line, each of said intermediate panels being of less depth than the depth of each of said flaps; said ancillary panel being integrally and hingedly joined to said plurality of intermediate panels along said third common score line whereby said latter panels are located intermediate said flap and said ancillary panel; said intermediate panels, on folding of the blank and erection of the carton, being adapted to be instrumental in limiting movement of said handle member in said retracted position.

19. A one-piece blank according to claim 16, wherein said blank is cut and scored to provide a pair of shoulders on said ancilliary panel which thereby serve as the said means cooperating with said common edge to limit the amount of movement of said reduced carrying portion of the handle member beyond said common edge.

References Cited in the file of this patent

UNITED STATES PATENTS

| | | |
|---|---|---|
| 2,730,294 | Stavis et al. | Jan. 10, 1956 |
| 2,731,191 | Layne | Jan. 17, 1956 |
| 2,795,369 | Caster et al. | June 11, 1957 |
| 2,865,553 | Wasyluka | Dec. 23, 1958 |
| 2,990,999 | George et al. | July 4, 1961 |